(12) United States Patent
Nowottnick

(10) Patent No.: US 8,442,719 B1
(45) Date of Patent: *May 14, 2013

(54) FIELD SUPERPOSITION APPARATUS, SYSTEM AND METHOD THEREFOR

(75) Inventor: Juergen Nowottnick, Hamburg (DE)

(73) Assignee: NXP B.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 13/334,324

(22) Filed: Dec. 22, 2011

(51) Int. Cl.
*G06F 7/00* (2006.01)

(52) U.S. Cl.
USPC .............................. 701/36; 701/49

(58) Field of Classification Search ............ 701/36, 701/49
See application file for complete search history.

(56) References Cited

U.S. PATENT DOCUMENTS

| | | | |
|---|---|---|---|
| 6,218,932 B1 | 4/2001 | Stippler | |
| 6,747,545 B2 | 6/2004 | Nowottnick | |
| 6,937,136 B2 | 8/2005 | Greenwood et al. | |
| 7,420,455 B2 * | 9/2008 | Nowottnick | 340/5.61 |
| 7,426,275 B2 | 9/2008 | Sugawara | |
| 7,705,710 B2 | 4/2010 | Hermann | |
| 8,069,350 B2 * | 11/2011 | Nowottnick | 713/168 |
| 2008/0024322 A1 | 1/2008 | Riemschneider | |
| 2012/0229254 A1 * | 9/2012 | Nowottnick | 340/5.61 |
| 2012/0280788 A1 * | 11/2012 | Nowottnick | 340/5.61 |

FOREIGN PATENT DOCUMENTS

| | | |
|---|---|---|
| DE | 10131097 A1 | 1/2003 |
| DE | 10255880 A1 | 6/2004 |
| DE | 102005013910 B3 | 9/2006 |
| EP | 0980800 A2 | 2/2000 |
| EP | 1136955 A2 | 9/2001 |
| EP | 1189306 A1 | 3/2002 |

* cited by examiner

*Primary Examiner* — Mary Cheung
*Assistant Examiner* — Michael Berns

(57) ABSTRACT

Wireless communications between a vehicle base station and transponder is authenticated. Two or more antennas including at least one within a vehicle are respectively driven using driving currents multiplied by different superposition factors for at least two iterative cycles. Separate vector components of the respective fields emitted by the antennas are used for calculating superposition factors. For each cycle, each antenna is concurrently driven using the same phase respectively using the driving currents multiplied by the superposition factors, and superposed vector components are detected for a superposed signal including signals from both antennas. Communications are authenticated via the detected superposed vector components for each for the superposed signal of each cycle being within a system error-based range of the sum of the vector components for each of the antennas as multiplied respectively by the superposition factors for the antenna from which the vector components are received.

19 Claims, 4 Drawing Sheets

FIELD SUPERPOSITION APPARATUS, SYSTEM AND METHOD THEREFOR

Aspects of various embodiments of the present invention are directed to wireless communications, and in particular to field superposition in wireless communications for ensuring source security.

Many wireless communication systems employ transponders and base stations that communicate with one another. For example, transponders can be used in automotive applications for passive keyless entry (PKE) for unlocking the doors of a vehicle, or passive keyless go (PKG) for enabling an ignition circuit. Generally, transponders communicate with a base station to unlock doors and/or an automobile ignition, or otherwise enable related circuits.

Unfortunately, such communications systems are susceptible to attacks. For instance, in automobile applications in which a user's transponder is used to unlock and/or enable the ignition of a vehicle, relay devices can be used to relay signals between the transponder and a base station at the vehicle. An attacker can position himself near the vehicle in proximity of the base station, while another attacker positions himself near the user and his/her transponder. Wireless communications between the attackers serve to relay signals between the base station and transponder, and can open and/or otherwise enable the vehicle's ignition.

These and other matters have presented challenges to the design and implementation of wireless systems for a variety of applications.

Various example embodiments are directed to field superposition circuits, apparatus, systems and their implementation and manufacture, and to addressing challenges such as those identified in the background above.

In connection with one or more embodiments, different randomized superposition factors are used to drive one or two interior vehicle antennas to generate communication fields for respective communication cycles. A response to the generated fields as received at a remote transponder in communication with the antennas is used, together with information characterizing the superposition factors, to authenticate the antenna.

In accordance with another embodiment, wireless communications are effected as follows. Signals are communicated using same-phase driving currents multiplied by superposition factors that are based upon vector components of respective fields emitted by the antennas. Communicating the signals in this context may, for example, involve transmitting the signals or receiving the signals, such as by driving different antennas or receiving signals at a transponder. In some instances, at least one of the antennas is within a vehicle, and both antennas are driven at different times respectively using at least two different superposition factors. Communications are authenticated using superposed vector components of a superposed signal including both of the communicated signals, based upon an error-based range of the sum of the separate vector components for each of the antennas as multiplied respectively by the superposition factors.

According to an example embodiment, wireless communication between a vehicle base station and a transponder is effected as follows. Two or more antennas are driven using first driving currents (e.g., each antenna is driven with a driving current, which may or may not be the same). At least one antenna is separated from the transponder by a portion of a vehicle in which the vehicle base station resides, and its signal is correspondingly passed via the vehicle. Separate vector components of the respective fields that are emitted by the antennas and received at the transponder, are detected and superposition factors for the antennas are calculated based upon the separate vector components. The antennas are concurrently driven using the same phase, respectively using the first driving currents multiplied by the superposition factors. Superposed vector components are detected for a superposed signal including signals from both antennas received at the transponder. The transponder is authenticated in response to the detected superposed vector components being within an error tolerant range of the sum of the separate vector components for each of the antennas as multiplied respectively by the superposition factors for the antennas.

Another example embodiment is directed to wirelessly communicating between a vehicle base station and a transponder. Two or more antennas including at least one interior antenna are respectively driven using transmission currents $I_I$ and $I_O$, with the interior antenna being separated from the transponder by a portion of a vehicle in which the vehicle base station resides. At the transponder, $x_I$, $y_I$ and $z_I$ vector components of the field strength emitted by the interior antenna are measured, as are $x_O$, $y_O$ and $z_O$ vector components of the field strength emitted by the other antenna. A signal indicative of the measured vector components is transmitted to the vehicle base station. At the vehicle base station, superposition factors n and m are calculated for respectively applying to the measured signals from the antennas and during iterative cycles, based upon the transmitted signal indicative of the measured vector components, the superposition factors are encrypted, and the encrypted superposition factors are transmitted to the transponder. Signals from each of the interior and exterior antennas are concurrently transmitted to the transponder using the same phase, respectively using transmission currents $I_I*n$ and $I_{O1}*m$ (with n and m changing for each cycle). At the transponder, $x_S$, $y_S$ and $z_S$ vector components are measured from a superposed signal including the signals from both antennas, and the transponder is authenticated in response to each of $x_S$, $y_S$ and $z_S$ respectively being within an error tolerant range of the sum of the respective vector components of signals from each of the antennas, multiplied by the superposition factors.

Other embodiments are directed to a system for authenticating a wireless communication. In one embodiment, such a system includes one or both of a transponder and a vehicle base station as follows. The transponder receives and detects separate vector components of respective fields emitted by antennas of a vehicle, and including one or more interior antennas separated from the transponder by a portion of the vehicle. The vehicle base station concurrently drives the antennas respectively in-phase and using first driving currents for communicating with the transponder, respectively using the driving currents multiplied by superposition factors calculated for the interior and exterior antennas based upon the separate vector components. The transponder detects superposed vector components of a superposed signal, including signals from both antennas received at the transponder. The vehicle base station authenticates the transponder in response to the detected superposed vector components for the superposed signal being within an error tolerant range of the sum of the separate vector components for each of the antennas as multiplied respectively by the superposition factors.

The above discussion/summary is not intended to describe each embodiment or every implementation of the present disclosure. The figures and detailed description that follow also exemplify various embodiments.

Various example embodiments may be more completely understood in consideration of the following detailed description in connection with the accompanying drawings, in which.

Figure 1:
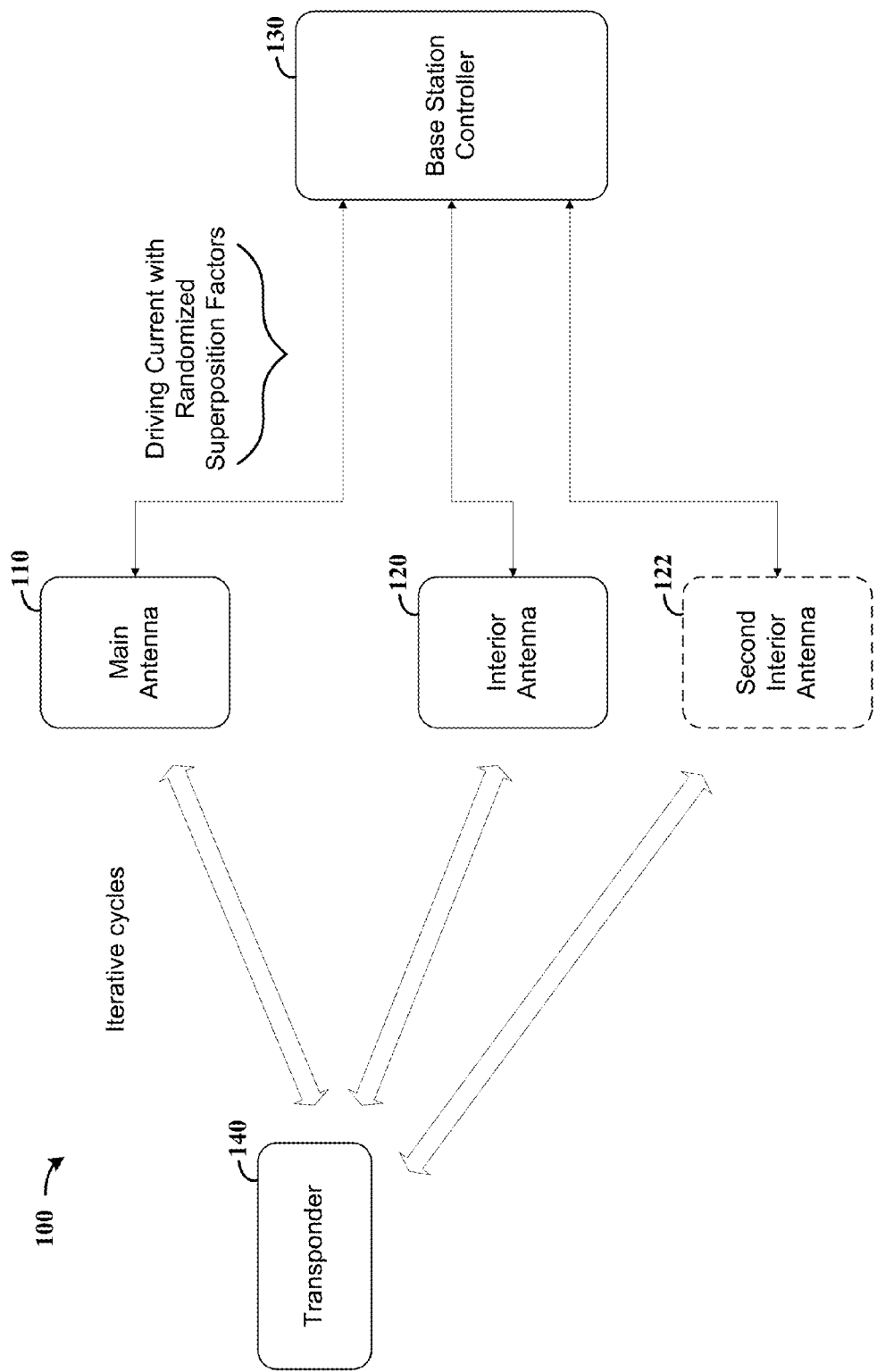
FIG. 1 shows a wireless system with field superposition, in accordance with an example embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention including aspects defined in the claims. In addition, the term "example" as used throughout this application is only by way of illustration, and not limitation.

Aspects of the present invention are believed to be applicable to a variety of different types of devices, systems and arrangements for field superposition involving transponder-base station coupling, including those involving automotive applications. While the present invention is not necessarily so limited, various aspects of the invention may be appreciated through a discussion of examples using this context.

In accordance with one or more embodiments, factors corresponding to a superposed field are provided with a signal presented to a remote transponder, and used in verifying the authenticity and/or proximity of a corresponding response of the transponder for operating a circuit, such as an unlocking mechanism and/or an ignition mechanism for a vehicle. Such applications may, for example, be implemented with passive keyless entry (PKE) or passive keyless go (PKG) applications in the automotive realm. The factors are based upon two or more superposition values generated and used for communicating during two or more iterative cycles, with a communication corresponding to the respective cycles used to authenticate the communications.

In a more particular example embodiment, a superposed field is used in connection with the communication of information from a base station to a transponder via two (or more) vehicle antennas including at least one interior antenna, such as via two interior antennas or three antennas including two interior antennas and one exterior antenna. When a transponder is in proximity of the vehicle, the antennas pass a signal to the transponder for communicating therewith. The transponder responds to the signals by providing another signal that is detected by the antennas. The base station applies a value to those signals passed from the antenna to the transponder. The superposed signals are analyzed (e.g., at the transponder and/or the base station), and the base station authenticates the communication/transponder based upon the analysis. This authentication can initially be used to determine that the transponder returning a signal is also receiving the signal from the antennas (e.g., that there is no relay), which can be followed with additional authentication that the transponder is appropriate for the vehicle (e.g., via subsequent encrypted communications). This authentication can be used, for example, to operate or enable a system, such as an entry/locking mechanism or an ignition mechanism.

Each interior antenna is placed relative to the vehicle such that the combination of the antenna and the body of the vehicle affect the signal presented by the interior antenna. In this context, the body of the car is used together with the antenna to provide a combined signal source that is difficult to match or otherwise identify. For instance, replicating such a combined antenna-type arrangement could require replication of the vehicle structure. Accordingly, various embodiments are directed to using antenna placement with the vehicle to generate a signal that is difficult to replicate (e.g., masked by the vehicle body), as in generating an in-homogenous field.

In some implementations, the superposition of signals is repeated a number of times (k times) with randomized and hidden superposition factors $n_1$-$n_K$ and $m_1$-$m_K$ for respective n and m signals. Accordingly two or more antennas are driven multiple times, with the same phase, using a driving current that is based upon the superposition factors for the particular cycle during which the antennas are driven. In some implementations, transmission error as pertaining to transmission paths between each respective antenna and a transponder, with the error pertaining to vector components dx, dy and dz of a field generated by the antenna, is set to a value beyond which an error or attach is detected. In some implementations, a single vector component can be evaluated and used to detect whether a communicated value is within an error range.

The vector components can be detected using one or more of a variety of approaches. For example, a transponder may include an antenna apparatus that is configured to detect a magnetic field direction and strength. Such antenna apparatuses and/or related may include, for example, one or more aspects as described in European Patent No. EP1189306A1 "A Security System," which is fully incorporated herein by references. For example, a three-coil antenna may be used to detect respective vector components of signals generated via each antenna as discussed herein, with the vector components being subsequently used to generate further authentication communications. Other aspects may be directed to one or more approaches as described in U.S. patent application Ser. No. 13/046,194, entitled "Field Superposition System and Method Therefor" and which is also fully incorporated herein by reference.

In certain embodiments, two antennas are both placed interior to a vehicle, and generate a field that must pass through a portion of the vehicle in order to be detected by a transponder. In some implementations, the interior antennas are placed relative to one other based on a trade off of at least a low-value (e.g., minimum) geometric separation between the inner antennas to achieve different distances/field interference with a transponder, and a high-value (e.g., maximum) geometric separation between the antennas, that mitigates separately detecting/sensing the respective antennas via a sense coil.

In some implementations, the base station generates signals using vector components of the field presented by the antennas as received at the transponder and communicated back to the base station as follows. The received signal strength indicator (RSSI) is measured for vector components (x, y, z) of the received field strength emitted by a first antenna at a transmission current $I_O$, to obtain a signal having vector components ($x_O$, $y_O$, $z_O$). The RSSI is also measured for vector components (x, y, z) of the received field strength emitted by second antenna, at transmission current $I_I$, to obtain a signal having vector components ($x_I$, $y_I$, $z_I$). In some embodiments, the first and second antennas are both interior antennas. These RSSI measurements can be carried out using proportional field strengths, for reception at a common transponder position. The results ($x_O$, $y_O$, $z_O$ and $x_I$, $y_I$, $z_I$) are encrypted and transmitted back to the base station using, for example, ultra high frequency (UHF) communications.

At the base station, factors m and n to be applied to the antenna signals in generating a superposed signal are calculated as follows, for each of at least two iterative cycles (e.g., superposition is repeated a "k" number of times with randomized and hidden factors $n_1$-$n_K$ and $m_1$-$m_K$, while driving the antennas with exactly the same phase). A randomly-superposed field strength is applied, such that:

$$[x_O*m, y_O*m, z_O*m] \sim [x_I*n, y_I*n, z_I*n+\text{random value}].$$

The superposed (phase adjusted) field strength can be set such that it is safely above an expected noise level:

$$[x_O*m, y_O*m, z_O*m] + [x_I*n, y_I*n, z_I*n] > \text{noise level}.$$

The calculated values for n and m are encrypted and transmitted to the transponder, such as by using UHF or low frequency (LF) signals.

The base station activates the antennas at the same time with the same phase. The transmission current of the transmitter is adjusted for each antenna for each cycle as follows:

$I_{O1,m1} = I_{O1}*m_1$ and $I_{I,n1} = I_I*n_1$
$I_{O1,m2} = I_{O1}*m_2$ and $I_{I,n2} = I_I*n_2$
...
$I_{O1,mK} = I_{O1}*m_K$ and $I_{I,nK} = I_I*n_K$ The transponder or base station evaluates the following conditions based on the received (measured) vector components (superposed), transmitted by both antennas ($x_{super}$, $y_{super}$, $z_{super}$), for each cycle:

$$x_O*m + x_I*n - dx < x_{super} < x_O*m + x_I*n + dx \quad (a)$$

$$y_O*m + y_I*n - dy < y_{super} < y_O*m + y_I*n + dy, \text{ and} \quad (b)$$

$$z_O*m + z_I*n - dz < z_{super} < z_O*m + z_I*n + dz, \quad (c)$$

with dx, dy and dz factors corresponding to expected errors, such as those due to phase jitter, measurement accuracy, and driver current accuracy. If all conditions a-c are true for each cycle, it is determined that the transponder is in front of a valid vehicle. If conditions a-c are not all true, a relay attack is detected (e.g., the inserted relays could not create the expected vector components of the magnetic field produced by the antennas).

In some implementations, a single-relay attack is detected as follows. The measured vector components ($x_{O1}$, $y_{O1}$, $z_{O1}$) and ($x_I$, $y_I$, $z_I$) are normalized as follows:

$$[x_O, y_O, z_O]/\text{MAX}[x_O, y_O, z_O]*100\% = [x_{Onorm}, y_{Onorm}, z_{Onorm}], \text{ and}$$

$$[x_I, y_I, z_I]/\text{MAX}[x_I, y_I, z_I]*100\% = [x_{Inorm}, y_{Inorm}, z_{Inorm}]$$

Using these normalizations, if $$[x_{O1norm} - x_{Inorm}] < dx \text{ AND}$$

$$[y_{O1norm} - y_{Inorm}] < dy \text{ AND}$$

$$[z_{O1norm} - z_{Inorm}] < dz,$$

where dx, dy, dz are determined by the errors due to phase jitter, measurement accuracy, driver current accuracy, a single 1D coil based EMU attack is detected and the process is stopped. This single coil based relay attack can thus be detected without necessarily normalizing the vector components and carrying out the related additional steps above.

The number of cycles for repeating superposition can be set using one or more of a variety of approaches. For example, assuming both LF antennas can also be regulated by the attacker in discrete slots and the superposition is done K times, the trial and error RSA break probability by a random attack can estimated to be:

$$P = 100\% \cdot (E_{AO1} \cdot E_{AI})^K$$

This estimation assumes independent success probabilities for guessing the right driver antenna value for each transmitter antenna. Because of the fixed relative location between the relay driver antennas and the valid FOB, it can be assumed that if one received vector component is emulated successfully the other components are in the expected range too. For instance, three repetitions of the field superposition can be used with 10% overall system errors ($E_{AO1} = E_{AI}$), the attack success probability for such an advanced attack is only P=0.0001%.

In accordance with another example embodiment, a wireless system includes a base station that communicates with a remote transponder via two or more antennas local to the base station, with one of the antennas being arranged such that its signal is at least partially hidden or obstructed from the remote transponder (e.g., within a vehicle that distorts the signal from the antenna). The base station superposes a field upon signals passed via the antennas using field strength factors corresponding to each antenna. The signals are transmitted to the remote transponder via the antennas in phase and at the same time, along with the field strength factors (e.g., encrypted). The base station further analyzes signals received from the transponder to verify one or more of the authenticity and proximity of the transponder, using the field strength factors.

In more particular example embodiments, a system as discussed above is implemented with three or more antennas, including at least one interior antenna as discussed, as well as an additional exterior antenna. The additional exterior antenna can be used to hide or otherwise mitigate the accurate detection of a signal from the interior antenna.

In another embodiment, the base station tracks the number of unsuccessful access tries (e.g., for passive keyless entry (PKE)) and temporarily or permanently disables a corresponding system. This approach can be used to mitigate trial and error relay attacks.

In accordance with the above examples, some embodiments are directed to systems including a base station, transponder and antennas including at least one interior vehicle antenna. Other embodiments are directed to subcomponents of such a system. For instance, various embodiments are directed to a base station configured to operate in accordance with the above, to generate signals, encrypt field strength factors, and communicate with a transponder. The base station may compare superposed fields as detected by a transponder and communicated to the base station, for authenticating the transponder. Another example embodiment is directed to a transponder that receives and communicates signals as discussed above, and may compare superposed fields as discussed above using field strength factors received from a base station.

Various embodiments of the present invention can be applied to a multitude of different applications. As consistent with the discussion herein, one or more embodiments may be implemented with a variety of different types of passive keyless entry or passive keyless go systems. For example, methods, systems, base stations or transponders as discussed herein may be implemented in connection with components and/or all of a transponder system such as described in U.S. Patent Publication No. 2008/0024322, or in U.S. Pat. No. 7,426,275, which are fully incorporated herein by reference.

Turning now to the figures, FIG. 1 shows a wireless system 100 with field superposition, in accordance with another example embodiment of the present invention. The system 100 includes a main antenna 110 and interior antenna 120, which pass signals from a base station/controller 130 to a remote transponder 140. Optionally, the system also includes a second interior antenna 122 operated in a manner similar to that of the interior antenna 120, and as otherwise described herein in which two or more interior antennas are used. The interior antenna 120 is shielded, such as by a vehicle shell or other component, from direct access by the transponder 140 or from direct access by sense coils external to the vehicle.

Various embodiments are directed to one, more than one or all of the aspects shown in FIG. 1, including one or more of circuits, apparatuses, systems, methods for operating such components and methods for manufacturing such components. For example, certain embodiments are directed to a vehicle base station that operates in accordance with the base station 130, and can be implemented with a variety of antennas, related circuitry and with a variety of different types of transponders. Other embodiments are directed to a transponder that operates in accordance with the transponder 140, and interacts with antenna(s) and a base station(s) as shown. Other embodiments are directed to antennas and/or interconnecting circuitry that operate as shown. Still other embodiments are directed to a combination of one or more components, such as a vehicle system involving a base station and antennas, or a system involving a base station, antennas and one or more transponders configured and arranged to communicate with the base station via the antennas. Still other embodiments are directed to software-based aspects as may be implemented, for example, for operating one or more of the base station 130 and the transponder 140 in accordance with one or more embodiments as discussed herein.

The base station 130 drives the main and interior antennas 110 and 120, and the transponder 140 detects the signals from the antennas, including vector components for each signal. The transponder communicates encrypted information characterizing these detected signals back to the base station 130, which uses the information to generate multiple (e.g., randomized) field superposition factors for use in iteratively driving each antenna. The base station 130 further encrypts and sends the superposition factors to the transponder 140.

The base station 130 then applies the respective superposition factors to drive each antenna at the same time, in-phase, for each of two or more cycles in which different superposition factors are used for each antenna, at each cycle. The transponder detects the superposed signals, which are used together with the superposition factors to determine whether the superposed signals (including a combined signal from each antenna) are within an error factor for each cycle. In some implementations, each superposed signal is authenticated by determining whether each of three vector components (e.g., x, y and z) is within an error factor for that vector. If the combined signal is within the error factor, the transponder is authenticated. This authentication can be used, for example, to operate or enable a system, such as an entry/locking mechanism or an ignition mechanism. In addition, calculations for authenticating the signal (e.g., as in accordance with the equations above) can be made at one or both of the transponder and the base station, with the transponder communicating information characterizing the received signals to the base station for such a calculation in the latter example.

Figure 2:
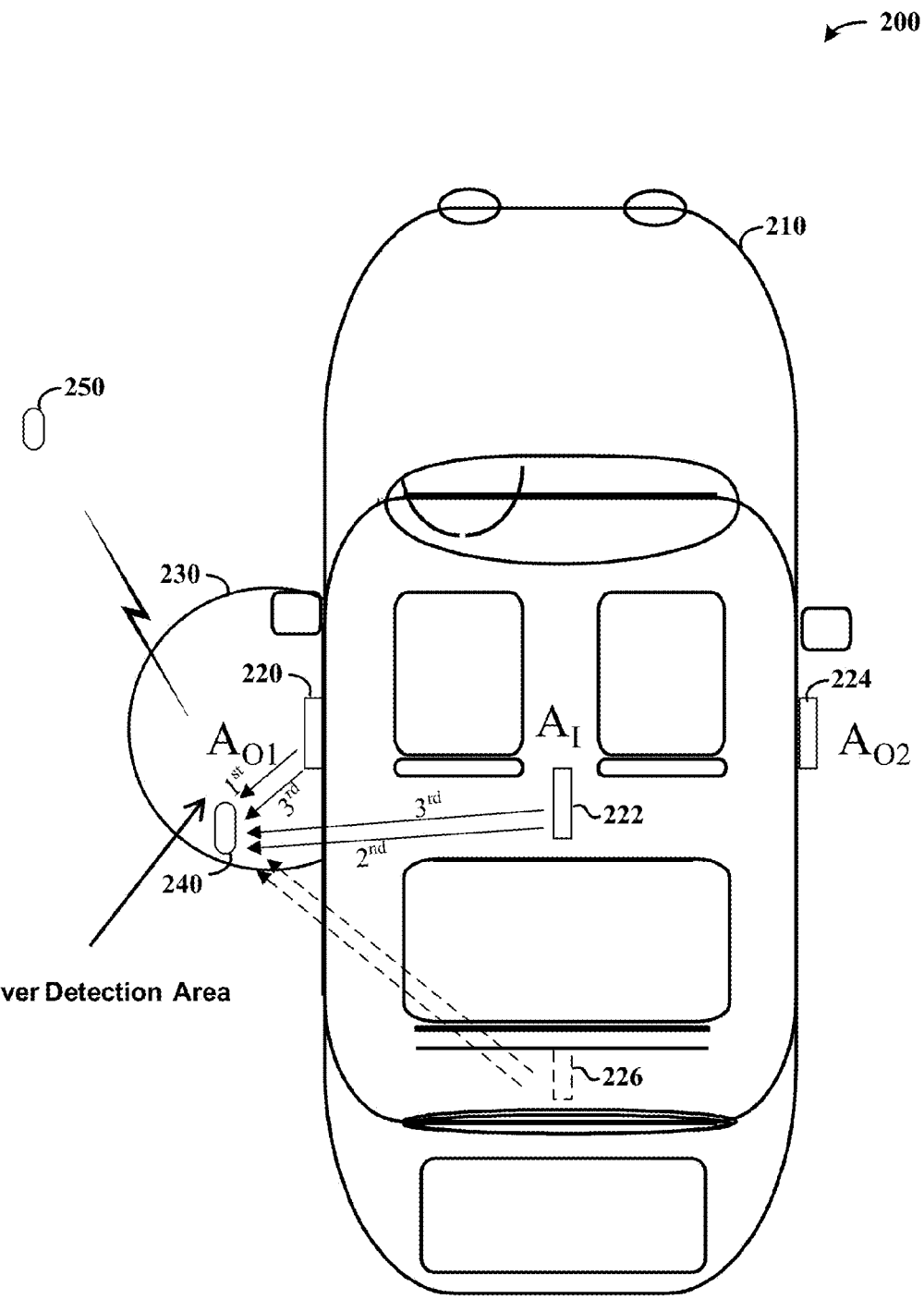
FIG. 2 shows a wireless automotive system with field superposition, in accordance with another example embodiment of the present invention.

FIG. 2 shows a wireless automotive system 200 with field superposition, in accordance with another example embodiment of the present invention. The system 200 includes a base station within a vehicle 210, an exterior antenna 220, interior antenna 222 and, in some instances, a second interior antenna 226. While the second interior antenna 226 is not discussed in the following, its implementation can be carried out in a manner similar to that with interior antenna 222, and operated in accordance with one or more embodiments as discussed herein. Also shown but optional, a second exterior antenna 224 is located opposite the exterior antenna 220, relative to the vehicle 210. The positioning of the respective antennas can be varied to suit different embodiments and application to different types of vehicles 210, with both the vehicle and the antenna positioning being exemplary of a multitude of vehicles and antenna configurations (with the interior antenna 222 being shielded).

The exterior and interior antennas 220 and 222 (and 224, 226 where applicable) are configured to transmit a signal that is detectable by a transponder within the indicated driver detection area 230. When used, the second interior and exterior antennas 224 and 226 are also configured to transmit a signal (e.g., with antenna 224 accessible via a passenger-side transponder, and antenna 226 accessible by a transponder within the driver detection area 230).

The vehicle 210 shields the interior antenna 222 from an exterior transponder, such that a signal from the interior antenna is not directly detectable by a transponder or attacker in the driver detection area 230. For example, glass, metal or other components of the vehicle 210 may distort the signal sent by the interior antenna 222, such that the transponder does not directly detect the signal as generated at the antenna.

By way of example, a transponder 240 is shown placed in the driver detection area 230, representing an exemplary interaction with the system 200. Optionally, the transponder 240 is part of the system, and operates to communicate signals with the base station in the vehicle 210, via one or both antennas 220 and 222 (or 224 where implemented).

The base station (e.g., a circuit within the vehicle 210) drives the antennas 220 and 222 at an initial transmission current for each antenna (e.g., the currents may be different, with the antennas subsequently driven). Signals with respective vector components corresponding to each antenna 220 and 222 are detected at a transponder (such as 240) and sent back (e.g., encrypted) to the base station in vehicle 210. The base station uses the detected vector components for each antenna 220 and 222, together with a random field strength value (high enough to account for noise/errors), to generate multiple field strength factors to apply to respective signals used to subsequently drive each of the antennas during respective iterative cycles.

The base station then drives the antennas 220 and 222 via the application of a driving current at the same time and with the same phase, for each antenna. The respective driving currents correspond to the initial current previously applied to that antenna, multiplied by the field strength factor for that antenna. The antennas are driven for each of multiple cycles. The superposed signal detected at the transponder is processed with error data corresponding to the respective antennas, and the known field strength factors for each antenna to determine a condition of authenticity of the transponder. Such authenticity may be determined, for example, as determining whether the transponder receiving and processing the signal is in the driver detection area 230, or has received a signal in this detection area as detected by a relaying transponder. For instance, where transponder 240 is a relaying transponder, and a transponder 250 is actually authenticated for the vehicle 210 but is out of the driver detection area 230, the relaying transponder 240 is incapable of generating the fields from each antenna with respective vector values.

The second interior antenna 226 is placed, relative to the first interior antenna 222, using one or more of a variety of approaches. In some implementations, the second antenna 226 is placed relative to the first antenna 222 to achieve a tradeoff between minimum and maximum distances respectively achievable to ensure that the respective antennas provide separate signals useful for superposition as discussed herein, yet mitigating sense coil detection of the separate antennas.

Figure 3:
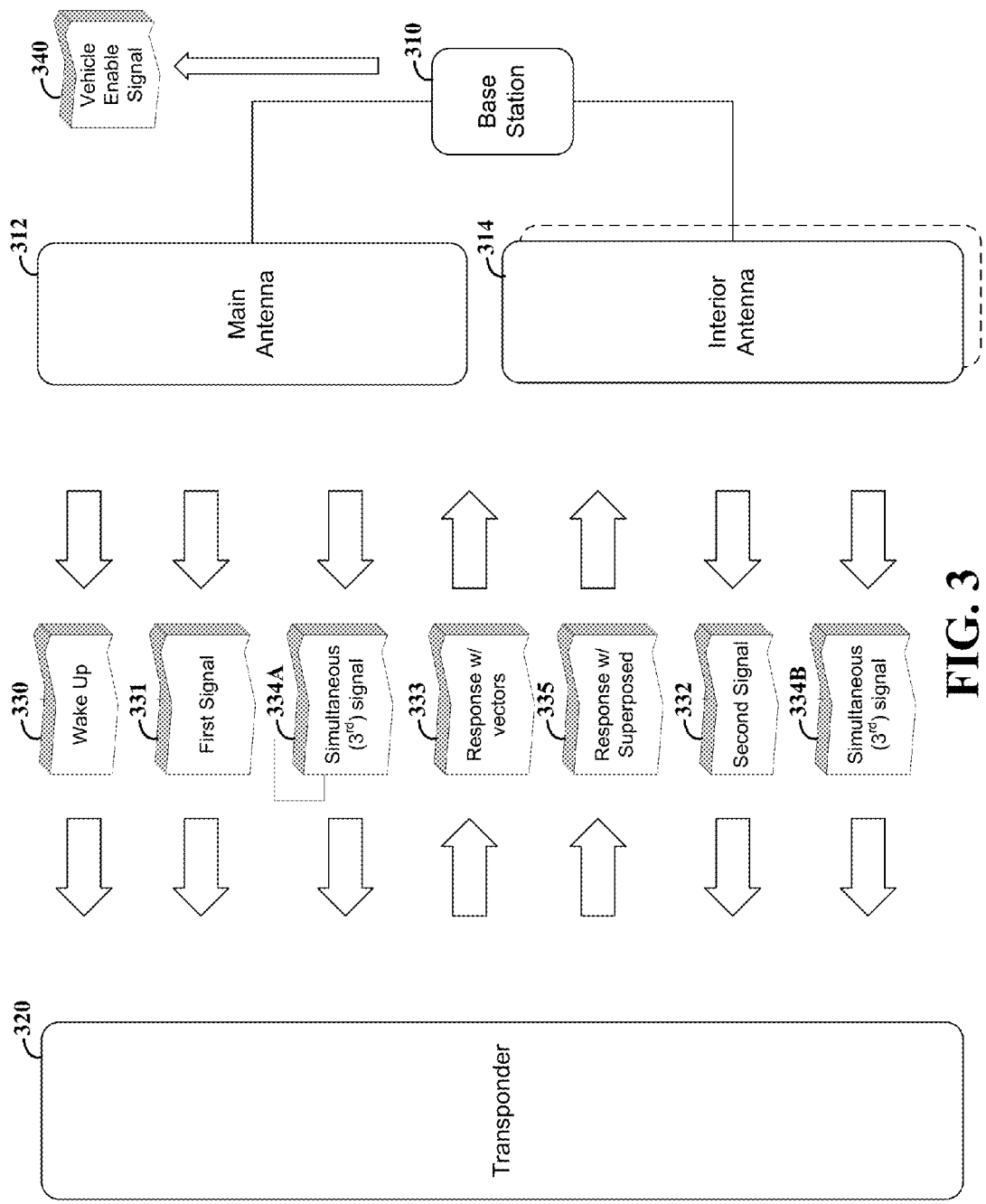
FIG. 3 shows a system and related data flow for transponder authentication, in accordance with another example embodiment of the present invention.

FIG. 3 shows a system 300 and related data flow for transponder authentication, in accordance with another example embodiment of the present invention. The system includes a base station 310 as well as a main antenna 312 and an interior antenna 314 that the base station respectively drives for communicating with a transponder 320. The base station 310 drives the main antenna 312 to send a wake-up signal 330 to the transponder 320, and subsequently to send a first signal 331 that is detected at the transponder 320 for determining vector components thereof. In this context, the main antenna 312 can be external or internal to a vehicle, with sufficient strength for effecting both wake-up and RSSI measurements. The base station 310 then drives the interior antenna 314 to send a second signal 332 that is also detected at the transponder 320, for determining vector components of the second signal.

The transponder 320 sends a response signal 333 that includes information characterizing the respective vector components detected via the first and second signals, to the base station 310 (e.g., via UHF communication). The base station uses the vector components and a random value to calculate superposition factors for each antenna using one or more approaches as discussed herein. At each of two or more iterative cycles, the base station drives the main and interior antennas simultaneously, using superposition factors as provided for each cycle, to produce simultaneous signals 334A and 334B. The superposition factors may, for example, be generated using iterative random values for each cycle, based on the detected vector components as presented via the response signal 333.

The transponder 320 detects these simultaneous signals as a superposed signal and determines vectors thereof. The transponder 320 sends a response signal 335 including information characterizing the superposed signals, for each signal provided by the main and interior antennas. This step may involve, for example, using encrypted superposition factors sent with one or both of the simultaneous signals 334A and 334B to the transponder 320, to respectively determine the components of the superposed signal attributable to the respective antennas. Such factors may be sent with each of the iterative signals.

If the signals for each of the iterative cycles fall within an error-free range, the base station 310 generates a vehicle enable signal 340, to enable a vehicle circuit such as a drive circuit (e.g., an engine ignition) or an entry circuit. In some instances, the signals for each cycle are evaluated to determine whether the signals fall within the error free range, as the signals are received. In other instances, the signals for each cycle are evaluated together, once all signals have been received.

Various communications as shown in FIG. 3 may be implemented using one or both of the disparate main and interior antennas 312 and 314. For instance, the wake-up signal 330 may be sent by either the main or interior antenna. Similarly, signals sent from the transponder 320 for use at a base station 310 may be sent via either of the main or interior antennas 312 and 314, and may involve UHF communications. In addition, the communications between the antennas and the transponder can be effected using different types of communications mediums. For instance, a LF signal can be sent from the antennas to the transponder, and the transponder may communicate back to the base station via the antennas using a UHF signal, or either all LF or all UHF signals can be used. In addition, a second interior antenna can be used as discussed herein, to further authenticate the transponder.

Figure 4:
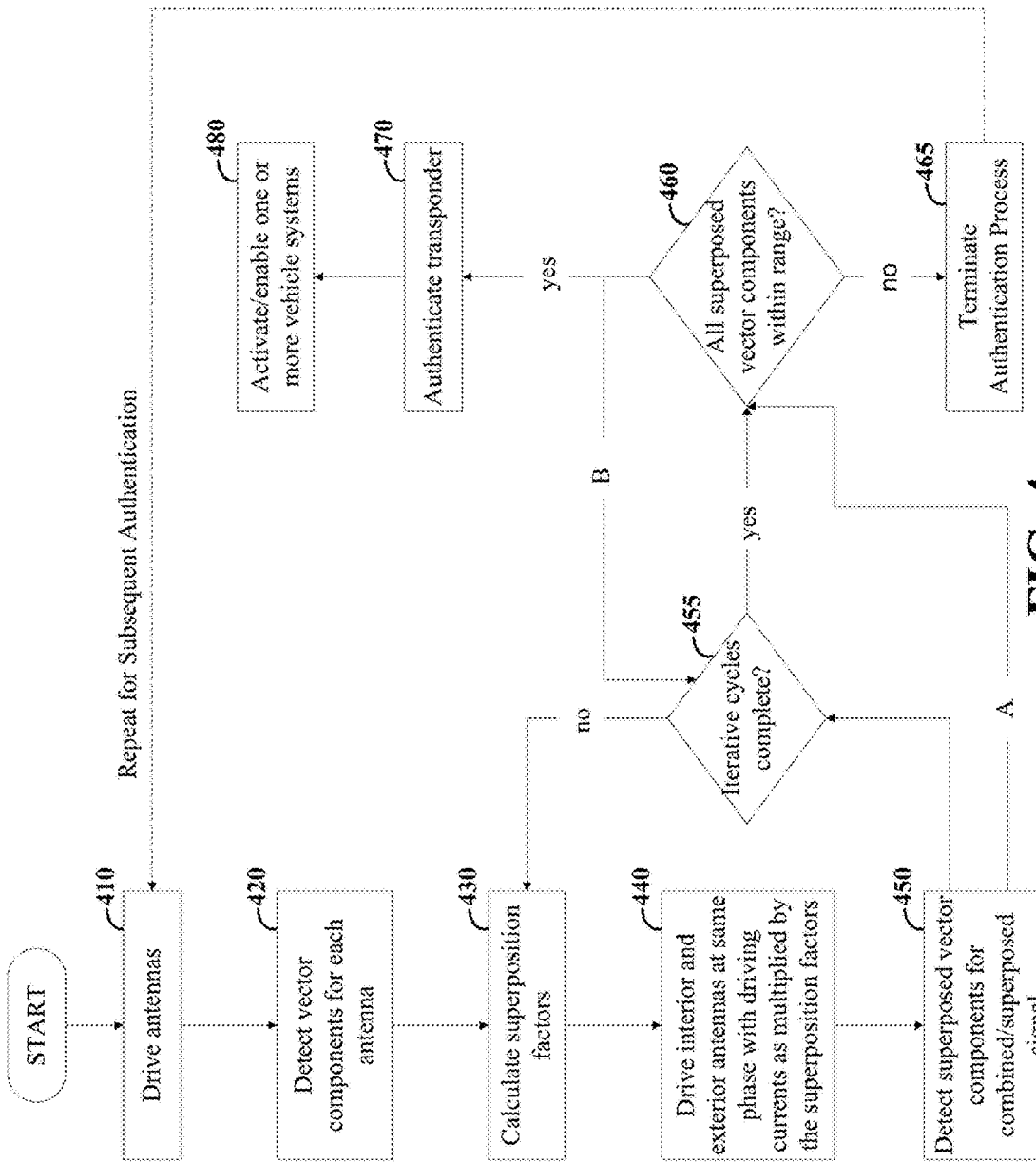
FIG. 4 shows a data flow diagram for wireless authentication with field superposition, in accordance with an example embodiment of the present invention.

FIG. 4 shows a data flow diagram for wireless authentication with field superposition using iterative cycles and randomized superposition factors for each cycle, in accordance with an example embodiment of the present invention. At block 410, respective antennas are driven using first driving currents (e.g., a different current for each antenna, at different times), with at least one interior antenna being separated from the transponder by a portion of a vehicle in which the base station resides. At block 420, separate vector components are detected for each of the respective fields emitted by the antennas and received at the transponder.

At block 430, superposition factors are calculated for the antennas based upon the separate vector components, and each of the antennas is driven at the same time using the same phase at block 440, respectively using the driving currents multiplied by the superposition factors. At block 450, superposed vector components are detected for a superposed signal including signals from both antennas received at the transponder.

If the iterative cycles are complete at block 455, the process continues at block 460 as discussed further below. If the iterative cycles are not complete at block 455, the process returns to block 430 at which additional superposition factors for a next iterative cycle are calculated. In some instances, blocks 410 and 420 are also repeated for each iterative cycle, to generate vector components that are specific to each cycle. In other instances in which the process returns from block 455 directly to block 430, the vector components generated at blocks 410 and 420 are re-used for additional cycles.

If the detected superposed vector components for each of the iterative cycles are within an error-based range of the sum of the separate vector components for each of the antennas (as multiplied respectively by the superposition factors for the antennas) at 460, the transponder is authenticated at block 470. This authentication may involve, for example, authenticating the transponder as being present in front of the vehicle and receiving the communications directly, rather than via a relay circuit (e.g., to mitigate relay station attacks), and/or via cryptographic communications approaches as may be implemented therewith. In some implementations, one or more circuits are enabled in the vehicle at block 480, based upon the authentication at block 470. Such circuits may include, for example, an entry circuit that unlocks a door to the vehicle, an ignition circuit that unlocks an ignition for starting the vehicle, or another locking circuit such as a brake-lock circuit or a fork-lock circuit for a motorcycle that mitigates driving of the vehicle when engaged.

If the detected superposed vector components are not within the error-based range at 460, the authentication process terminates at 465. In some implementations, the authentication process is permitted to re-start at block 410 under certain conditions as represented by a dashed line between blocks 465 and 410. For instance, the process may be re-started at block 410 while using a counter or other approach to track a number of unsuccessful authentication attempts. After a predefined number of unsuccessful attempts have been made (e.g., as limited to a particular time period), the process termination at block 465 does not permit a re-start at block 410 until after a predefined time period has expired or another reset condition has been met. Other steps, such as an automatic notification to a user of such attempts (e.g., via mobile device such as via text messaging to a mobile telephone, or via another type of alert) can also be initiated upon process termination and/or a termination after the predefined number of unsuccessful attempts has been met.

In certain embodiments, the detected superposed vector components are evaluated once at each cycle. In these embodiments, represented by arrow "A," the process continues from block 450 to block 460, skipping block 455. If the superposed vector components for an instant cycle are not in range at block 460, the process terminates the authentication (e.g., detects an attack or error). If the superposed vector components for an instant cycle are in range at block 460, the process continues at block 455 (as shown by arrow "B") and, if the iterative cycles are complete, the process proceeds to block 470 and the transponder is authenticated. If the iterative cycles are not complete upon continuation at block 455, the process continues for the next cycle as discussed above, with the results of the next cycle also authenticated individually at block 460.

Based upon the above discussion and illustrations, those skilled in the art will readily recognize that various modifications and changes may be made to the present invention without strictly following the exemplary embodiments and applications illustrated and described herein. For example, additional antennas can be used, different communication types can be used between the antennas, and different approaches to applying field strength factors to signals passed to the transponder can be used. These approaches can be implemented in connection with the detection of fields from each antenna to determine whether the transponder actually authorized to operate a base station-located circuit within the appropriate proximity of the antennas, as relative to the vector values of signals detected by the antennas. Such modifications do not depart from the true spirit and scope of the present invention, including that set forth in the following claims.

What is claimed is:

1. An apparatus for authenticating communications between a user-based transponder and a vehicle-based circuit having first and second antennas, the apparatus comprising:
   a circuit configured and arranged to
      communicate a first signal between the first antenna and the transponder, therein providing vector components for the first antenna,
      communicate a second signal between the second antenna and the transponder, therein providing vector components for the second antenna,
      for each of at least two iterations, concurrently communicate same-phase signals between the respective antennas and the transponder, the same-phase signals from the respective antennas being generated using superposition factors that are based on the vector components of the antenna from which the same-phase signals are communicated, the superposition factors being different for each iteration, and
      authenticate the communications with the transponder by comparing summed vector components of magnetic fields of the same-phase signals for each iteration, as received at the transponder, to an error-based range for the respective vector components.

2. The apparatus of claim 1, wherein the circuit is configured and arranged to
   compare the summed vector components by multiplying the vector components for each signal respectively by the superposition factors for each signal, using vector components of a signal including both of the communicated same-phase signals.

3. The apparatus of claim 1, wherein the circuit is configured and arranged to generate the same-phase signals using randomized superposition factors.

4. The apparatus of claim 1, wherein the circuit is configured and arranged to authenticate the communications based upon at least one of the same-phase signals being passed through a portion of a vehicle in which the interior antenna resides, the portion of the vehicle altering a characteristic of the same-phase signal as used to generate the summed vector components.

5. The apparatus of claim 1, wherein the circuit is configured and arranged to drive the antennas with the same-phase driving currents multiplied by the different superposition factors to generate the same-phase signals.

6. The apparatus of claim 1, wherein the circuit includes the transponder.

7. The apparatus of claim 1, wherein the circuit is configured and arranged to drive the first and second antennas to communicate the first and second signals and the same-phase signals, and to authenticate the communications by determining, for each of different sets of the superposition factors, whether the sum of the separate vector components is within the error-based range.

8. The apparatus of claim 1, wherein the circuit is configured and arranged to
   concurrently drive the antennas using a same-phase driving current multiplied by different superposition factors that are based upon vector components of a field emitted by each antenna, each antenna being located within a vehicle,
   sum the separate vector components by superposing signals from the interior antennas, and
   authenticate the communications in response to the superposed vector components being within an error-based range of the sum of the separate vector components for the antennas as multiplied respectively by the superposition factors used for the respective antennas.

9. The apparatus of claim 1, the circuit being configured and arranged to, in response to the compared summed vector components being within the error-based range, generate an output signal configured and arranged to activate at least one of an ignition circuit and an entry circuit in a vehicle in which the circuit resides.

10. A method of wireless communication between a vehicle base station and a transponder, the method comprising:
   driving at least two antennas using first driving currents, the antennas including at least one interior antenna separated from the transponder by a portion of a vehicle in which the vehicle base station resides;
   detecting separate vector components of the respective fields emitted by the antennas and received at the transponder;
   calculating at least two different superposition factors for each of the antennas based upon the separate vector components;
   for at least two iterative cycles, concurrently driving the antennas using the same phase, respectively using the first driving currents multiplied by the superposition factors for each antenna, the superposition factors being different for each cycle;
   for each of the cycles, detecting superposed vector components of a superposed signal including signals from both antennas received at the transponder; and
   authenticating the transponder in response to the detected superposed vector components for each cycle being within an error-based range of the sum of the separate vector components for each of the antennas as multiplied respectively by the superposition factors for the antennas.

11. The method of claim 10, wherein calculating superposition factors includes calculating factors for the antennas, the product of the factor for a first one of the antennas and the separate vector components for the first antenna being equal to the sum of a random value plus the product of the factor for the second antenna and the separate vector components for the second antenna.

12. The method of claim 10, wherein authenticating the transponder includes enabling at least one of an ignition circuit and an entry circuit in the vehicle.

13. The method of claim 10, wherein authenticating the transponder includes transmitting, from the transponder, the detected superposed vector components to the vehicle base station, and authenticating the transponder at the vehicle base station.

14. The method of claim 10,
further including encrypting and transmitting the superposition factors to the transponder,
wherein authenticating the transponder includes detecting and using the encrypted superposition factors at the transponder, to determine whether the superposed vector components are within said error-based range of the sum of the separate vector components for each of the antennas.

15. A method for wirelessly communicating between a vehicle base station and a transponder, the method comprising:
driving antennas respectively using transmission currents $I_I$ and $I_O$, the antennas including at least one interior antenna separated from the transponder by a portion of a vehicle in which the vehicle base station resides;
at the transponder, measuring $x_I$, $y_I$ and $z_I$ vector components of the field strength emitted by the interior antenna, measuring $x_O$, $y_O$ and $z_O$ vector components of the received field strength emitted by the other antenna, and transmitting a signal indicative of the measured vector components to the vehicle base station;
at the vehicle base station, for each of a plurality of iterative cycles, calculating superposition factors n and m for respectively applying to the measured signals from the antennas, based upon the transmitted signal indicative of the measured vector components;
at the vehicle base station, encrypting the superposition factors and transmitting the encrypted superposition factors to the transponder;
for each of the cycles, concurrently transmitting signals from each of the antennas to the transponder using the same phase, respectively using transmission currents $I_I$*n and $I_{O1}$*m; and
at the transponder and for each cycle, measuring $x_S$, $y_S$ and $z_S$ vector components of a superposed signal including the signals from both antennas, and authenticating the transponder in response to each of $x_S$, $y_S$ and $z_S$ for each cycle respectively being within an error-based range of the sum of the respective vector components of signals from each of the antennas, multiplied by the superposition factors.

16. The method of claim 15, further comprising
for each cycle, normalizing the measured vector components $x_I$, $y_I$ and $z_I$, and $x_O$, $y_O$ and $z_O$, and subtracting the normalized vector components of the received field strength emitted by the interior antenna from the received field strength emitted by the other antenna, and
detecting a relay attack in response to the subtracted normalized vector components in each of the x, y and z directions respectively being less than expected errors in detected field strength in each of the x, y and z directions, for at least one of the cycles.

17. The method of claim 16, wherein, for each cycle,
driving the antennas respectively using transmission currents $I_I$ and $I_O$ includes driving each of the antennas during a period when the other of the antennas is not driven, and
measuring $x_I$, $y_I$ and $z_I$ vector components of the field strength emitted by the interior antenna, and measuring $x_O$, $y_O$ and $z_O$ vector components of the received field strength emitted by the other antenna includes measuring $x_I$, $y_I$ and $z_I$ vector components of the field strength emitted by the interior antenna during a period when the other antenna is not driven, and measuring $x_O$, $y_O$ and $z_O$ vector components of the received field strength emitted by the other antenna during a period when the interior antenna is not driven.

18. An apparatus for authenticating a wireless communication, the system comprising:
a transponder configured to receive and detect separate vector components of respective fields emitted by antennas of a vehicle, the antennas including an interior antenna separated from the transponder by a portion of the vehicle;
a vehicle base station configured to
drive the antennas respectively using first driving currents for communicating with the transponder, and
for each of a plurality of iterative cycles, concurrently drive each of the antennas using the same phase, respectively using the driving currents multiplied by superposition factors calculated for the antennas based upon the separate vector components, the superposition factors being different for each cycle;
the transponder being further configured and arranged to detect superposed vector components of a superposed signal including signals from both antennas received at the transponder; and
the vehicle base station being configured and arranged to authenticate the transponder in response to, for each cycle, the detected superposed vector components for the superposed signal being within an error-based range of the sum of the separate vector components for each of the antennas as multiplied respectively by the superposition factors for the antennas.

19. The apparatus of claim 18, wherein the vehicle base station is configured and arranged to, for each cycle,
normalize the vector components and subtract the vector components of the received field strength emitted by the interior antenna from the received field strength emitted by the other antenna, and
detect a relay attack in response to the subtracted normalized vector components in each of x, y and z directions respectively being less than expected errors in detected field strength in each of the x, y and z directions, for at least one of the cycles.

* * * * *